Sept. 20, 1960 W. STELZER 2,952,978
BOOSTER BRAKE MECHANISM
Filed Nov. 14, 1957 2 Sheets-Sheet 1

INVENTOR
WILLIAM STELZER

BY John V. Phillips

ATTORNEY

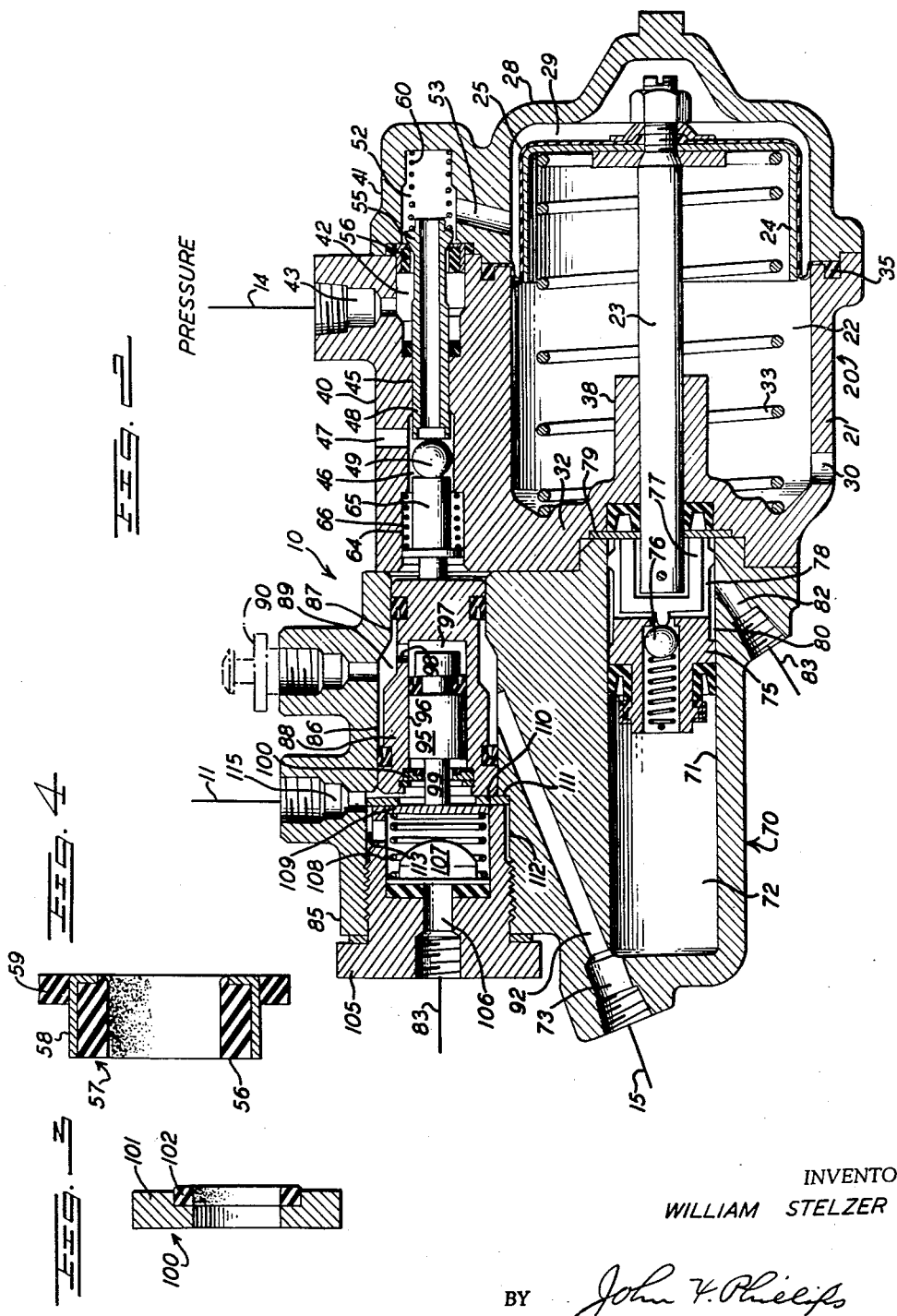

United States Patent Office 2,952,978
Patented Sept. 20, 1960

2,952,978

BOOSTER BRAKE MECHANISM

William Stelzer, Bloomfield Hills, Mich., assignor to Kelsey-Hayes Company, Detroit, Mich., a corporation of Delaware Filed Nov. 14, 1957, Ser. No. 696,534

8 Claims. (Cl. 60—54.6)

This invention relates to a booster brake mechanism, and more particularly to a novel control mechanism for the booster motor.

An important object of the invention is to provide for two stages of reaction against the brake pedal wherein, in the initial stage of brake pedal operation, resistance to the movement of the pedal is reduced, and wherein a higher degree of pedal reaction is provided after the brake shoes engage the drums.

A further object is to provide in such a mechanism a small auxiliary piston which is rendered inoperative during initial stages of brake operation to utilize line pressures acting in one direction for subtracting from line pressures acting in the opposite direction to oppose movement of the brake pedal, and wherein, during the second stage of reaction, the auxiliary piston balances out those line pressures acting in the first-named direction, thus rendering line pressures more effective after engagement of the brake shoes with the drums for transmitting reaction to the brake pedal.

A further object is to utilize a spring of the residual pressure valve as a transition spring to yieldingly bias the auxiliary piston referred to toward a piston in which the reaction produced by the line pressure opposing energization of the booster motor is reduced, thus providing for a light initial brake pedal.

A further object is to provide a novel arrangement of the auxiliary piston referred to which includes the use with a reaction piston of stop means for limiting movement of the auxiliary piston relative thereto when the residual valve spring yields to hydraulic line pressure, at which point the line pressure becomes more effective for transmitting reaction to the brake pedal.

Other objects and advantages of the invention will become apparent during the course of the following description.

In the drawings I have shown one embodiment of the invention. In this showing:

Figure 2 is an enlarged central longitudinal sectional view through the booster mechanism, the parts being shown in off positions;

Figure 3 is a detailed sectional view of a bumper for limiting movement of the auxiliary control piston; and Figure 4 is a similar view of a valve seat employed in connection with the control valve for the booster motor.

Figure 1:
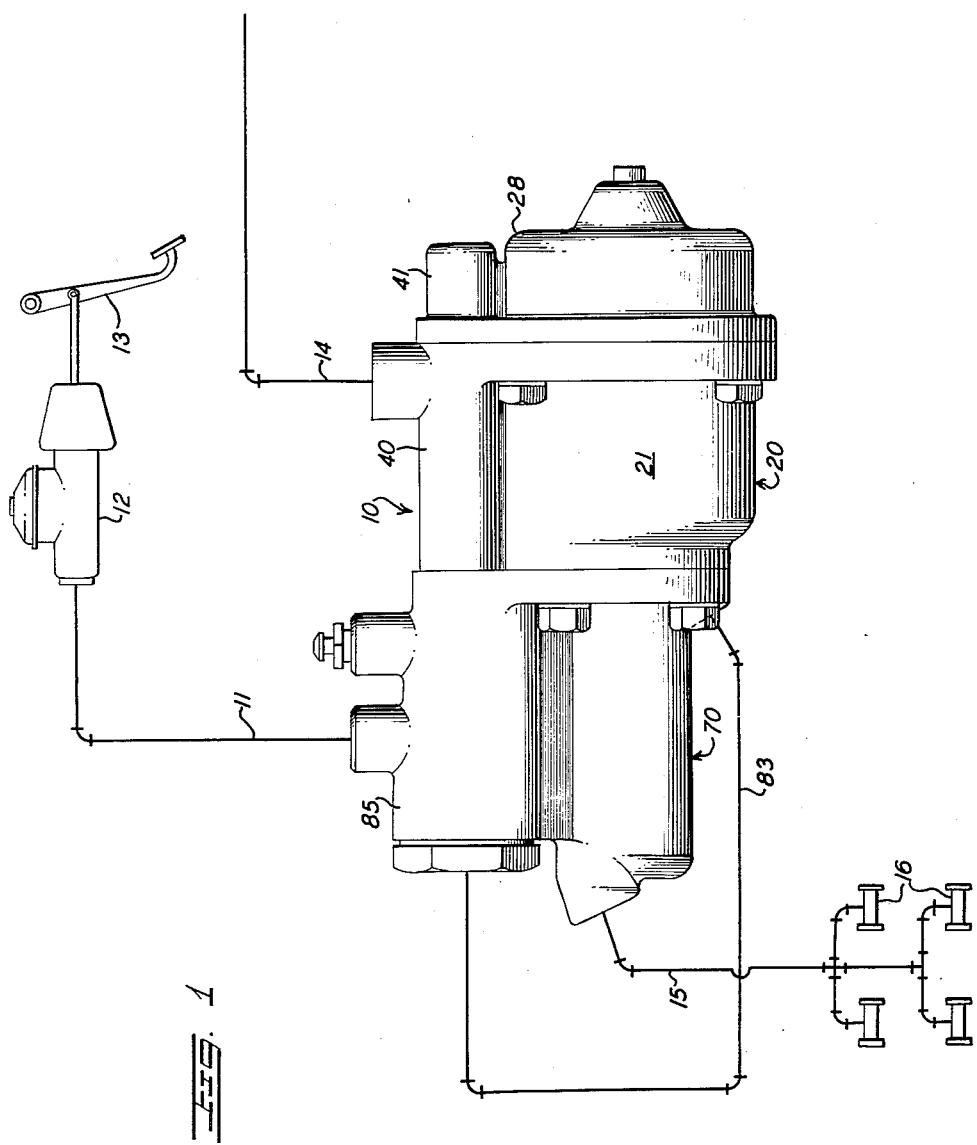
Figure 1 is a side elevation of the booster mechanism, the pedal operable master cylinder, wheel cylinders and hydraulic lines being diagrammatically shown.

Referring first to Figure 1, the numeral 10 designates the booster mechanism as a whole shown as being connected through a hydraulic line 11 to a conventional master cylinder 12 operable by the usual brake pedal 13. The motor of the booster mechanism in the present instance is operative from a source of super-atmospheric pressure, and a line 14 is connected from such source to the booster mechanism, as further referred to below. The hydraulic fluid outlet of the booster mechanism is connected by suitable fluid lines 15 to the vehicle wheel cylinders 16 of the usual type.

Referring to Figures 1 and 2, the motor for the booster mechanism is indicated as a whole by the numeral 20 and comprises a cast body 21 having a chamber 22 therein formed axially around a power operated push rod 23. This push rod is suitably connected to a cup 24 arranged within a pressure operable diaphragm 25. A preferably die-cast cover member 28 for the motor cooperates with the diaphragm 25 to form a pressure chamber 29 normally connected to the atmosphere and adapted to be connected to a source of super-atmospheric pressure in a manner to be described. The chamber 22 is in constant communication with the atmosphere as at 30. The body 21 is provided at the end opposite the cap 28 with an end wall 32, and a return spring 33 is arranged between this end wall and the cup 24 to bias the diaphragm 25 to the normal off position shown in Figure 2. A bead 35 on the diaphragm 25 is clamped between the members 21 and 28 as shown. The end wall 32 is provided with an axial bearing member 38 projecting into the chamber 22.

The body 21 is provided with a radially extending longitudinally elongated portion 40 which, together with a similarly extending portion 41 of the cap 28, forms a housing for the control valve mechanism for the motor 20. This housing includes therein a pressure chamber 42 communicating through a port 43 with the pressure line 14, described above.

The valve housing is provided with a bore 45, at the left-hand end of which (Figure 2) is formed a chamber 46 open to the atmosphere as at 47. A tubular valve member 48 is slidable in the bore 45 and has one end arranged in the chamber 46 to be engaged and closed by a ball valve 49. This valve is normally open as shown in Figure 2 and is adapted to be closed by means referred to below.

The tubular valve member 48 opens at its right-hand end (Figure 2) into a chamber 52 communicating through a passage 53 with the motor chamber 29. With the parts in the normal positions shown in Figure 2, the motor chamber 29 obviously is vented to the atmosphere.

The tubular valve member 48 carries a poppet valve 55 arranged in the chamber 52 and engageable with a valve seat 56 (Figure 4). This valve seat is formed of elastic material and is part of a valve seat unit indicated as a whole by the numeral 57 and including a metallic body 58 bonded thereto and carrying a deformable flange 59 clamped between the radial extensions 40 and 41. The poppet valve 55 is normally seated and is biased to closed position by a spring 60 (Figure 2).

The bore forming the chamber 46 communicates with a larger bore 64 in which is arranged an operating plunger 65 for the ball valve 49, the plunger 65 being biased to the normal position shown in Figure 2 by a spring 66, which spring also biases to normal position a control piston to be described.

A cast body 70 is secured in any suitable manner against the left-hand end of the body 20 as viewed in Figure 2 and is provided therein with a bore 71, one end 72 of which forms a high pressure chamber from which fluid is displaced into the wheel cylinders through a port 73 connected to the line 15. A fluid-displacing plunger 75 is slidable in the bore 71 and is provided with a ball valve 76 normally maintained in open position, when the parts are in the off positions shown in Figure 2, by a projecting end on a U-shaped flat clip member 77 arranged in a diametrical slot 78 formed in the plunger 75.

When the parts are in the off positions shown, the clip 77 engages against a washer 79 to unseat the ball 76 and thus normally establish communication between the chamber 72 and a chamber 80 back of the advancing end of the plunger 75. This means for normally connecting the chambers 72 and 80 is now conventional and forms per se no part of the present invention. The chamber 80 communicates through a passage 82 with a jump line 83, further described below.

The cast body 70 is provided with a radially extended longitudinally elongated portion 85 provided with a bore 86 intermediate its ends and a smaller bore 87 at the end adjacent the plunger 65. The bores 86 and 87 are coaxial with each other and with the plunger 65 and other elements of the valve mechanism. A control plunger 88 is provided with a larger end slidable in the bore 86 and a smaller end slidable in the bore 87, both of such ends being suitably sealed in their bores. Between the sealed ends of the plunger 88 is formed a chamber 89 adapted to be opened to the atmosphere through a conventional bleed plug 90 forming no part of the present invention. The chamber 89 is in fixed communication with the port 73 through a passage 92. It will be obvious that the smaller end of the plunger 88 engages the adjacent end of the plunger 65 to transmit movement thereto, under conditions to be described, to close the valve 49 and then move the tubular valve member 48 to open the poppet valve 49 to energize the motor.

An auxiliary plunger 95 is slidable in a bore 96 formed axially in the plunger 88, and the right-hand end of such bore (Figure 2) forms a chamber 97 in fixed communication through a port 98 with the chamber 89. The left-hand end of the auxiliary plunger 95 is provided with an axially extending stem 99 for a purpose to be described. The left-hand end of the plunger 95 in Figure 2 is normally spaced to the right of a stop member 100 shown in detail in Figure 3 and comprising a metal ring 101 having a deformable cushion insert 102 projecting from the side of the ring 101 adjacent the body of the plunger 95 to be engaged thereby under conditions to be described.

A plug 105 is threaded into the radial extension 85 and is coaxial with the plungers 88 and 95. The plug 105 is provided with an axial passage 106 communicating with the other end of the jump line 83. Within the plug 105 is arranged a residual pressure valve 107 which in itself is conventional and need not be specifically illustrated. The residual pressure valve includes a spring 108 biasing the body of the valve to closed position in accordance with conventional practice, and the other end of the spring 108 engages a plate 109 seated against a fixed washer 110. The washer 110 seats against a shoulder 111 formed at the inner extremity of the bore 112 into which the inner end of the plug 105 projects. The inner end of such plug is reduced to form with the bore 112 a chamber 113 communicating with the interior of the plug 105 and communicating also through a port 115 connected to the other end of the hydraulic line 11 leading from the master cylinder 12. It will be apparent that the port 115 also communicates with the space to the right of the washer 110, and since the opening through the stop member 100 is larger than the stem 99, the left-hand end of the auxiliary plunger 95 is always subject to pressure in the port 115 and chamber 113.

*Operation*

It will be noted that the residual pressure valve 107 maintains the usual normal pressure in the jump line 83, and since this line is normally in communication with the chamber 80 back of the plunger 75 and with the chamber 72 and the wheel cylinders through line 15, as well as with the passage 92 and chambers 89 and 97, all of these chambers, passages and lines will be maintained under residual pressure. However, there will be no pressure present in the chamber 113 which communicates with the master cylinder 12 through the line 11. The plate 109 will be maintained in engagement with the washer 110, and the auxiliary plunger 95 will be maintained in spaced relation to the stop member 100. The ball valve 49 will be open and the poppet valve 55 closed, hence the motor chamber 29 will be vented to the atmosphere. The spring 66 biases the control plunger 88 to the left, with its left-hand end in Figure 2 in engagement with the washer 110, this washer being clamped in position by the inner end of the plug 105.

When the mechanism is to be operated, the pedal 13 will be depressed to displace fluid from the master cylinder 12 through line 11 into the port 115 which, as stated, communicates both with the chamber 113 and the interior of the plug 105 and with the space to the right of the plate 109. The area of the control plunger 88 open to residual pressure will be that annular area represented by the difference between the diameters of the bores 86 and 87. A much greater area of the control plunger 88 will be exposed to pressure from the port 115, hence a pressure from the master cylinder substantially less than the residual pressure will move the control plunger 88 to the right from the position shown in Figure 2 to move the plunger 65 to the right and first seat the ball 49 and then crack the valve 55. The closing of the ball valve 49 disconnects the motor chamber 29 from the atmosphere while the cracking of the valve 55 admits super-atmospheric pressure around the valve 55 into the chamber 52 and through passage 53 into the motor chamber 29. Thus the diaphragm 25 will move to the left from the off position shown in Figure 2 to transmit movement to the push rod 23 and thus effect movement of the plunger 75. Initial movement of this plunger relieves pressure between the clip 77 and ball valve 76, whereupon the latter closes and pressure will be generated in the chamber 72.

This operation continues during initial brake operation to the point where the brake shoes are engaged with the drums. The pressure thus built up in the chamber 72 of course will be greater than the normal residual pressure, and the increased pressure will be transmitted to the chamber 89 to oppose valve operating movement of the plunger 88. Again the pressure acting to the left to oppose such movement of the plunger 88 will be represented by the annular difference in the areas of the bores 86 and 87. While such area is substantially less than that acted on by pedal generated pressures acting to the right against the plunger 88, the pressure in the chamber 89 will be substantially higher, and thus, in itself, will tend substantially to oppose valve operating movement of the plunger 88.

However, the pressures thus generated will act on the right-hand extremity of the bore 96, that is, the right-hand wall of the chamber 97, and this pressure acts toward the right and subtracts from the pressures in the chamber 89 opposing valve operating movement of the plunger 88. At this time it will be noted that the left-hand end of the auxiliary plunger 95 will still be spaced from the stop 100 with the stem 99 bearing against the plate 109. Therefore pressure in the chamber 97 affecting the control plunger 88 will act toward the right in the manner stated, and a relatively low net resistance to valve operating movement of the plunger 88 will be effected, thus preserving a "soft" initial pedal.

When the brake shoes engage the drums, there promptly will occur a substantial increase in pressure in the system, as is usual at this point, and accordingly such increased pressures will be effective in the chambers 89 and 97. The pressure in the latter chamber now becomes sufficiently great to overcome the loading of the spring 108 and the left-hand end of the body of the auxiliary plunger 95 will move into engagement with the stop 100, and from that point on, the plunger 95 becomes a unit with the plunger 88. Therefore, the same pressure which previously has acted to the right against the right-hand limit of the chamber 97 to partially counteract pressure in the chamber 89 acting toward the left against the plunger 88 will be exactly balanced and canceled out by pressure acting to the left against the end of the plunger 95 exposed to the chamber 97. The pressure in such chamber, therefore, is no longer effective for partially counterbalancing the reaction pressure in the chamber 89 acting toward the left against the plunger 88. The pressure in the chamber 89 therefore becomes a fully effective reaction pressure opposing valve operating movement of the plunger 88, and reaction pressure to the left of the plunger 88 will be built up and transmitted through line 11 to the master cylinder 12 to be felt by the operator through the pedal 13. From the foregoing it will be apparent that pressure present in the chamber 89 is always the same pressure which is transmitted to the wheel cylinders, even in the first stages of brake operation.

During such first stage of operation, however, the same pressure in the chamber 97 acts to the right to oppose pressure in the chamber 89 acting toward the left against the plunger 88, thus subtracting from the total pressure force acting to the left against the plunger 88 to provide a soft initial pedal. The partially counterbalancing pressure in the chamber 97, however, is canceled out when such pressure increases incident to initial engagement of the brake shoes with the drums, the body of the plunger 95 under such conditions engaging the stop member 100 by overcoming the spring 108, and therefore heavier reaction occurs during actual application of the brakes after the shoes have engaged the drums. Thus the present construction, while quite simple, effectively provides for relatively low reaction during initial operation of the brake pedal with a higher rate of reaction during later stages of brake operation after the brake shoes engage the drums. The reaction ratios may be expressed by simple formulae. If $a$ represents the area of the diameter of the bore 86; $b$, the area of the diameter of the bore 96, and $c$, the area of the diameter of the bore 87, then the booster ratio (i.e., secondary pressure in the high pressure side of the system versus primary pressure in the low pressure end of the system including line 11, chamber 113, etc.) before transition, which occurs upon the overcoming of the spring 108, may be expressed as follows:

$$\frac{a-b}{a-c-b}$$

The spring 108 of course acts as a transition spring between the two stages of reaction, and when this spring is overcome upon engagement of the brake shoes with the drums as stated above, the reaction ratio (if the force of the spring 108 is not considered) then becomes $$\frac{a}{a-c}$$

Actually, spring 108, after it has yielded, causes a gradual decrease in the booster ratio because the force of the spring is added to the force of the primary pressure against piston 88, whereby the ratio $a+a-c$ is approached closely only when the pressures are very high. The area of the plunger 95 in the second stage of reaction need not be considered since the pressure in the chamber 97 is canceled out so far as it has any effect in providing any net pressures acting in either direction.

It will be apparent that the device functions to provide a perfect follow-up action of the motor parts relative to brake application. In actual operation of the brakes, the valve 55 is merely cracked and if movement of the brake pedal is arrested, a very slight increase in pressure in the chamber 89 incident to a slight further increment of movement of the piston 75 causes the pressure in the chamber 89 to move the control plunger 88 slightly to the left, thus permitting the spring 60 to seat the poppet valve 55. Thus the admission of additional super-atmospheric pressure to the chamber 29 will be arrested. Any tendency for the plunger 75 to overrun a position determined in accordance with operation of the pedal 13 will result in a slight additional rise in pressure in the chamber 89 which will cause cracking of the ball valve 49 to bleed off some of the pressure in the motor chamber 29.

The operation of the parts in returning to normal positions upon the releasing of the brake pedal will be apparent. When the pedal is released, pressure acting to the right against the plungers 88 and 95 will be reduced substantially to atmospheric pressure, whereupon pressure in the chamber 89 will move the control plunger 88 back to its normal position shown in Figure 2, assisted by the spring 66. The poppet valve 55 will be released from all forces acting at the left-hand end of the tubular member 48, whereupon the poppet valve will be seated and, since the ball 49 will be released from the tubular valve member 48, pressure in the motor chamber 29 will promptly drop to atmospheric pressure. The return spring 33 will then promptly return the diaphragm 25 to its normal off position, and the plunger 75 likewise will be returned to normal position.

When the plunger 75 reaches normal position, the ball valve 76 will be disengaged from its seat to connect the chambers 72 and 80, thus providing for the replenishing of any loss of fluid from the system.

The valve mechanism and the operating parts therefor including the reaction means are all arranged coaxially, thus simplifying the device and its installation and eliminating any centering problems in the positioning or operation of any of the parts.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster brake mechanism comprising a hydraulic chamber having an outlet for connection with the vehicle brakes, a plunger movable into said chamber to displace fluid therefrom, a fluid pressure motor having a pressure responsive unit connected to said plunger, a valve mechanism connected between said motor and sources of relatively high and low pressures, a reaction unit connected to said valve mechanism and movable to operate it to connect said motor to said source of high pressure, a low pressure chamber to which one end of said reaction unit is exposed to be moved by pressure therein, means for supplying hydraulic fluid to said low pressure chamber, a reaction chamber communicating with said hydraulic chamber, said reaction unit having a bore opening through one end and having its other end forming a small chamber communicating with said reaction chamber and provided with an end wall facing toward said low pressure chamber, said reaction unit having surfaces in said reaction chamber larger than said end wall facing away from said low pressure chamber whereby there will be a net pressure opposing valve operating movement of said reaction unit by pressure in said low pressure chamber, a plunger in said bore having one end exposed to pressure in said small chamber of an area equal to the area of said end wall, means biasing said last-named plunger toward said end wall, and means limiting movement of said last-named plunger in the other direction relative to said reaction unit whereby, when pressure in said reaction chamber increases to a predetermined point, said last-named plunger will be moved away from said end wall and the pressure acting against said one end of said last-named plunger will be transmitted to said reaction unit and will cancel out the pressure acting against said end wall to render the pressure in said reaction chamber more effective in opposing valve-operating movement of said reaction unit.

2. A booster brake mechanism comprising a hydraulic chamber having an outlet for connection with the vehicle brakes, a plunger having a normal off position and movable into said chamber to displace fluid therefrom, a fluid pressure motor having a pressure responsive unit connected to said plunger, a valve mechanism connected between said motor and sources of relatively high and low pressures, a reaction unit connected to and movable in one direction to operate said valve mechanism to connect said motor to said source of high pressure, means engaging said reaction unit to limit its movement in the other direction to a normal position, a low pressure chamber to which one end of said reaction unit is exposed, means for supplying hydraulic fluid to said low pressure chamber to move said reaction unit in said one direction, a reaction chamber communicating with said hydraulic chamber, said reaction unit having oppositely facing surfaces exposed to pressure in said reaction chamber to provide a net pressure area acting against said reaction unit to oppose valve operating movement of such unit, means exposed to pressure in said reaction chamber to be operated upon an increase in pressure therein to a predetermined point for increasing the net area of said reaction unit opposing valve operating movement thereof, and means operable when said plunger is in said normal off position for maintaining residual pressure in said hydraulic chamber and in said reaction chamber.

3. A booster brake mechanism comprising a hydraulic chamber having an outlet for connection with the vehicle brakes, a plunger having a normal off position and movable into said chamber to displace fluid therefrom, a fluid pressure motor having a pressure responsive unit connected to said plunger, a valve mechanism connected between said motor and sources of relatively high and low pressures, a reaction unit connected to and movable in one direction to operate said valve mechanism to connect said motor to said source of high pressure, means engaging said reaction unit to limit its movement in the other direction to a normal position, a low pressure chamber to which one end of said reaction unit is exposed, means for supplying hydraulic fluid to said low pressure chamber to move said reaction unit in said one direction, a reaction chamber communicating with said hydraulic chamber, said reaction unit having surface areas exposed to said reaction chamber to oppose valve operating movement of said reaction unit, such unit having an oppositely facing smaller area exposed to pressure in said reaction chamber to subtract from the effectiveness of said first-named areas and thus reduce resistance to valve operating movement of said reaction unit by pressure in said low pressure chamber, means exposed to pressure in said reaction chamber and engageable with said reaction unit for canceling out the effectiveness of said oppositely facing area, and means operable when said plunger is in said normal off position for maintaining a residual pressure in said hydraulic chamber and in said reaction chamber.

4. A booster brake mechanism comprising a hydraulic chamber having an outlet for connection with the vehicle brakes, a plunger movable into said chamber to displace fluid therefrom, a fluid pressure motor having a pressure responsive unit connected to said plunger, a valve mechanism connected between said motor and sources of relatively high and low pressures, a reaction plunger connected to and movable in one direction to operate said valve mechanism to connect said motor to said high pressure source, a low pressure chamber to which one end of said reaction plunger is exposed, means for supplying hydraulic fluid to said low pressure chamber to operate said reaction plunger, a reaction chamber communicating with said hydraulic chamber, said reaction plunger having a bore extending thereinto from the end thereof adjacent said low pressure chamber, said bore having an end wall subject to pressure in said reaction chamber, an auxiliary plunger slidable in said bore, said reaction plunger having pressure areas greater than the area of said end wall facing in the opposite direction thereto, whereby pressures in said reaction chamber oppose valve operating movement of said reaction plunger by pressure introduced into said low pressure chamber, a spring in said low pressure chamber having mechanical connection with said auxiliary plunger to bias it toward said end wall, and means limiting movement of said auxiliary plunger in the other direction relative to said reaction plunger whereby, when pressure in said reaction chamber increases to a predetermined point, pressure exerted against said auxiliary plunger will move it to its limit of movement in said other direction and reaction chamber pressures will be transmitted to said reaction plunger to cancel out pressure acting against said end wall.

5. A mechanism according to claim 4 provided with a primary chamber at the end of said fluid displacing plunger opposite said hydraulic chamber, such plunger having a normal off position and being provided with means affording communication between said primary and hydraulic chambers solely when said plunger is in said off position, a duct connected between said low pressure chamber and said primary chamber, and a residual pressure valve device controlling communication between said low pressure chamber and said duct and including said spring.

6. A mechanism according to claim 5 provided with a stop member limiting movement of said reaction plunger toward said low pressure chamber, a plate in said low pressure chamber engaging said stop member and movable therefrom by pressure acting against said auxiliary plunger, one end of said spring engaging said plate, a primary chamber at the end of said fluid displacing plunger opposite said hydraulic chamber, a valve in said fluid displacing plunger biased to closed position and having means for holding it in open position when said fluid displacing plunger is in a normal off position, a duct connected between said low pressure chamber and said primary chamber, and a residual pressure valve device controlling communication between said low pressure chamber and said duct and including said spring.

7. A booster brake mechanism comprising a hydraulic chamber having an outlet for connection with the vehicle brakes, a plunger movable into said chamber to displace fluid therefrom, a fluid motor having a pressure responsive unit connected to said plunger, a valve mechanism connected between said motor and sources of relatively high and low pressures, a pressure responsive reaction member connected to said valve mechanism to operate it to connect said motor to said source of high pressure, a body having cylinder means formed therein, one end of said reaction member forming with said body a low pressure chamber, means for supplying hydraulic fluid to said low pressure chamber to move said reaction member and operate said valve mechanism, the other end of said reaction member forming with said cylinder means a reaction chamber communicating with said hydraulic chamber, said reaction member having a bore opening through said one end thereof and having its other end forming a small chamber communicating with said reaction chamber and provided with an end wall facing toward said low pressure chamber, said reaction member having surfaces in said reaction chamber larger than said end wall facing away from said low pressure chamber whereby there will be a net pressure opposing valve operating movement of said reaction member by pressure in said low pressure chamber, a plunger in said bore having an end open to said reaction chamber and of an area substantially equal to the area of said end wall, means biasing said last-named plunger toward said end wall, and means engageable with said last-named plunger to limit movement thereof in the other direction relative to said reaction member whereby, when pressure increases to a predetermined point, said last-named plunger will be moved to its limit of movement and pressure acting against said end of said last-named plunger will be transmitted to said reaction unit and will cancel out the pressure acting against said end wall, to render the pressure in said reaction chamber more effective in opposing valve operating movement of said reaction member, 8. A mechanism according to claim 7 wherein said cylinder means comprises a pair of concentric cylindrical bores opening into each other, one such bore being larger than the other and being adjacent the end of said reaction member toward said one end thereof, opposite ends of said reaction member being slidable in the respective cylindrical bores in sealed relation thereto, surfaces of said reaction member between said cylindrical bores forming said surfaces larger than said end wall.

References Cited in the file of this patent

UNITED STATES PATENTS

| | | |
|---|---|---|
| 2,548,496 | Rockwell | Apr. 10, 1951 |
| 2,638,747 | Rockwell | May 19, 1953 |
| 2,866,318 | Ingres | Dec. 30, 1958 |
| 2,878,647 | Schultz | Mar. 24, 1959 |
| 2,879,645 | Ingres | Mar. 31, 1959 |